(12) United States Patent
Huber et al.

(10) Patent No.: US 9,454,547 B2
(45) Date of Patent: Sep. 27, 2016

(54) COMPUTER SYSTEM AND METHOD FOR IMAGE PROCESSING

(71) Applicant: Siemens Aktiengesellschaft, Munich (DE)

(72) Inventors: Peter Huber, Windsbach (DE); Kerstin Huwer, Erlangen (DE); Jing Lu, Shanghai (CN); Michael Scheuering, Nuremberg (DE); Grzegorz Soza, Heroldsberg (DE); Stefan Thesen, Dormitz (DE); Wei Wang, Shanghai (CN)

(73) Assignee: Siemens Aktiengesellschaft, Munich (DE)

( * ) Notice: Subject to any disclaimer, the term of this patent is extended or adjusted under 35 U.S.C. 154(b) by 29 days.

(21) Appl. No.: 14/554,292

(22) Filed: Nov. 26, 2014

(65) Prior Publication Data
US 2015/0146948 A1 May 28, 2015

(30) Foreign Application Priority Data
Nov. 28, 2013 (DE) .................. 10 2013 224 422

(51) Int. Cl.
*G06K 9/00* (2006.01)
*G06F 17/30* (2006.01)
(52) U.S. Cl.
CPC ................ *G06F 17/3028* (2013.01)
(58) Field of Classification Search
CPC combination set(s) only.
See application file for complete search history.

(56) References Cited

U.S. PATENT DOCUMENTS

| 2002/0138660 A1* | 9/2002 | Eilers | G06F 9/5055 719/313 |
| 2005/0041839 A1* | 2/2005 | Saitou | H04N 1/00127 382/103 |

OTHER PUBLICATIONS

Edwards et al., "High Security Web Servers and Gateway," Hewlett Packard Web Publication (1996).
German Wikipedia article Installation (computer), (2013).
Wikipedia article: Installation (computer programs) (2010).

* cited by examiner

*Primary Examiner* — Alex Liew
(74) *Attorney, Agent, or Firm* — Schiff Hardin LLP

(57) ABSTRACT

A computer system for image processing has a first working environment with a first program for image processing, as well as a second working environment, logically separated from the first working environment, with a second program for image processing. The first working environment is implemented on a first server. Furthermore, the first working environment is designed to receive a first command to execute the first program and a second command to execute the second program, and to send the second command to the second working environment. The second working environment is designed to send an image processed by the second program to the first working environment. The communication of a user with the first and second program thus occurs via a uniform platform in the form of the first working environment, and the integration of the second program for image processing into the workflow is facilitated.

21 Claims, 3 Drawing Sheets

COMPUTER SYSTEM AND METHOD FOR IMAGE PROCESSING

BACKGROUND OF THE INVENTION

1. Field of the Invention

The invention concerns a computer system and a method for image processing.

2. Description of the Prior Art

Medical imaging encompasses acquisition of raw data, reconstruction of image data from raw data, and processing of the image data. The acquisition of raw data takes place by operation of an imaging apparatus, for example a C-arm x-ray apparatus, a computed tomography apparatus or a magnetic resonance tomography apparatus. The acquisition of raw data, the reconstruction of image data and the processing of the image data take place by operation of systems and programs for data processing. In specific cases, systems and programs that are legally permitted as medical products must be used for medical diagnostics. Permitted programs are thus provided for processing of image data at a computer system. The integration of unpermitted programs (which should be used for testing purposes, for example) has proven to be difficult. For testing, these programs must have access to the image data but it must be ensured that they cannot harm the original image data nor the computer system that provides the permitted programs.

One solution is to provide a separate computer system, but such a separate computer can only be poorly integrated into the clinical workflow. For example, such a separate computer system does not have direct access to the image data that are stored on an archive server, also known as a PACS (Picture Archiving and Communication System), and so a more elaborate data transfer to or from the separate computer system is required. An alternative solution is realized by the Osirix working environment, which allows additional, unpermitted programs to be installed. If an unpermitted program is executed within Osirix, a warning is emitted. This solution provides only an insufficient security, however, because wide-ranging access rights are granted to the unpermitted program during its execution. An incorrect harmful program can thereby result in an unwanted modification of patient data or even further ranging harm. Furthermore, neither of the two solutions provides a platform in order to simply modify programs or provide new programs.

SUMMARY OF THE INVENTION

An object of the invention is to facilitate the integration of an unpermitted program for image processing in the clinical workflow, while simultaneously ensuring security for the execution of the unpermitted program for image processing.

In the following, the achievement of the object according to the invention is described in relation to a system and in relation to a method. Advantages or alternative embodiments that are described with respect to the system are analogously applicable to the method, and vice versa. The functional features of the method are developed by corresponding substantive modules.

The above object is achieved in accordance with the invention by a computer system having a first working environment with a first program for image processing, and having a second working environment, logically separated (i.e., separated by computer image) from the first working environment, with a second program for image processing, wherein the first working environment is implemented on a first server. The first program is typically a program permitted as a medical product, and the second program is a program that is not permitted as a medical product, such that the logical separation of the working environments ensures the security given execution of an unpermitted program for image processing. Furthermore, the first working environment according to the invention is designed to receive a first command to execute the first program and a second command to execute the second program, and to send the second command to the second working environment, wherein the second working environment is designed to send an image processed by the second program to the first working environment. Communication by a user with the first program and second program thus occurs via a uniform platform in the form of the first working environment, so the integration of an unpermitted program for image processing into the clinical workflow is facilitated.

According to a further aspect of the invention, the computer has a first client with a uniform user interface to send the first command and the second command to the first working environment. The integration of the first and second program into the clinical workflow is increased via the uniform user interface. Fast switching between the working environments and their respective program is thereby possible for a user of the first computer system.

According to a further aspect of the invention, the second working environment is designed to send an image processed by the first program and the image processed by the second program to the client for presentation in the uniform user interface. The integration into the clinical workflow and the user-friendliness of the computer system according to the invention are increased via the uniform presentation of the images processed by different programs.

According to a further aspect of the invention, the first working environment is designed to receive image data and to send the image data to the second working environment. The first working environment thereby also represents a uniform platform with regard to the transfer of image data.

According to a further aspect of the invention, the second working environment is implemented on the first server, whereby the computer system is designed to be particularly compact.

According to a further aspect of the invention, the second working environment is implemented on a second server that is different than the first server, whereby a particularly high flexibility is provided in the design of the computer system.

According to a further aspect of the invention, the computer system is designed to update the second program stored in the second working environment by means of a network. The updating via a network takes place particularly quickly and with a low operating cost, such that the integration of the second program is further increased.

According to a further aspect of the invention, the computer system is designed to mark the image processed by means of the second program. If the second program is an unpermitted program, most of all the security is thereby increased since, through the marking, it is indicated to the user whether it is an image that was processed by a permitted program or an unpermitted program.

According to a further aspect of the invention, the second working environment provides a third program to control an imaging apparatus, wherein the second working environment is directly connected with an imaging apparatus so that the computer system is designed to control the imaging apparatus by means of the third program. If the third program is a program that is not permitted as a medical product, the computer system according to the invention therefore also enables the testing of a newly developed program to control a medical apparatus, in particular to acquire medical image data.

Furthermore, the invention can be realized as a method with the following steps:
- REC_COM: receive a first command to execute a first program for image processing, as well as a second command to execute a second program for image processing, via a first working environment, wherein the first working environment is implemented on a first server, wherein the first program is provided by the first working environment, wherein the second program is provided by a second working environment that is logically separate from the first working environment.
- TRA: send the second command from the first working environment to the second working environment.
- SEN_PIC: send the image processed by the second program to the first working environment.

In one variant, the method according to the invention includes the following step:
- SEN_COM: send the first command and the second command from a uniform user interface of a first client to the first working environment.

According to a further aspect, the method according to the invention includes the following steps:
- SEN_PIC: send an image processed by the first program or the image processed by the second program to the first client.
- DIS: display the processed image in the uniform user interface.

A variant of the method according to the invention includes the following steps:
- REC_DAT: receive image data via the first working environment.
- SEN_DAT: send the image data from the first working environment to the second working environment.

Furthermore, the method according to the invention can include:
- UPD: update the program stored in the second working environment by means of a network.

In a development of the method according to the invention, the following step is executed:
- MAR: mark the image processed by means of the second program.

According to a further aspect of the method according to the invention, thus includes the following step:
- CON: control an imaging apparatus via execution of a third program stored in the second working environment, wherein the second working environment is directly connected with the imaging apparatus.

As used herein, a "program" is a computer program, namely a program that can be executed by means of a computer system or a computer. The program can be stored as an executable file. A program for image processing is designed to process image data if the program is executed on a computer system. A program includes program code with a series of instructions, wherein the instructions are executed upon execution of the program.

A program can be permitted as a medical product, wherein the criteria for the permitting are stipulated by laws, guidelines or rules. In the sense of the present application, "permitted" also includes validated, designated, certified and synonymous terms. For example, the CE designation is mandated to bring specific medical products to the market in the European Economic Area. In the USA, a 510(k) certificate of validity is required to bring to market medical products of Class II and a small number of medical products of Class I. In the sense of the present application, a permitted program can thus be a program permitted (or, respectively, validated, designated or certified) as a medical product.

As used herein a "working environment" is an information technology infrastructure within which a program can be executed. A working environment can include both hardware elements and software elements. For example, a working environment can be realized via an operating system and a software platform, wherein the software platform provides the communication of the program to be executed with the operating system. Both the first working environment and second working environment thereby provide sufficient means (for example working memory or computing capacity) in order to be able to execute the first or, respectively, second program.

In the sense of the present application, the first and the second working environment are logically separated from one another. The logical separation can be realized by what is known as sandboxing or by the implementation of the second working environment as a virtual machine. It is thereby possible that the first and second working environment access different hardware components. The separate working environments can thus each have a central processing unit, its own working memory, or its own cache.

In the narrower sense, "a client" is a client application in the form of a program that is executed at the computer of a user such that it is designed for communication with a server. In particular, such a program can provide a uniform user interface. Furthermore, a client can be the computer of a user at which the client application is executed.

As used herein "image data" are spatially two-dimensional or spatially three-dimensional digital image data composed of pixels or voxels. Image data in particular include image data reconstructed from raw data, wherein "raw data" means the data directly acquired by an imaging apparatus. For example, image data can be reconstructed from raw tomographical data by the Feldkamp algorithm, or an iterative algorithm, or an exact algorithm. As used herein, the acquisition of image data is thus also the acquisition of raw data from which image data can be reconstructed.

The image data can have been acquired with the use of a contrast agent. Generally defined as contrast agents are compositions that improve the depiction of structures and functions of the body in imaging methods. Within the scope of the present application, contrast agents are both conventional contrast agents (for example iodine) and tracers, for example $^{18}$F, $^{11}$C or $^{13}$N.

The terms "image data" and "images" are in principle to be understood as being synonymous. In the present application, "image data" are image data that have not yet been processed by the first or second program; differentiated from this, "processed images" are those images that have been processed by the first or second program. However, image data can have been processed by other programs; for example, the image data can be filtered or segmented. Both image data and images can be present in the DICOM format.

Examples of the processing of image data are rendering, segmentation, modification of the image impression (such as contrast or resolution), determination of structures and their properties in the image data (for example of calcifications and stenosis) or the creation of a visual model (for example a vascular tree) on the basis of the image data. In particular, image processing also includes medical image processing, thus the processing of medical image data. "Medical image data" are image data that have been acquired by operation of a medical imaging apparatus.

An imaging apparatus is an apparatus that is designed to acquire image data or, respectively, raw data for reconstruction of image data. A medical imaging apparatus is designed to acquire image data of a living subject (a person, for example), in particular such that the acquired image data are suitable for diagnostic purposes. In order for the image data to be suitable for diagnostic purposes, they must have a sufficient image quality, for example a sufficient resolution or a sufficient contrast.

X-ray apparatuses (such as C-arm x-ray apparatuses) are one class of medical imaging apparatuses. Tomography apparatuses (such as computed tomography apparatuses or magnetic resonance tomography apparatuses) are an additional class of medical apparatuses. Accordingly, medical image data, namely image data suitable for diagnostic purposes, can be x-ray image data or tomographical image data.

DESCRIPTION OF THE PREFERRED EMBODIMENTS

Figure 1:
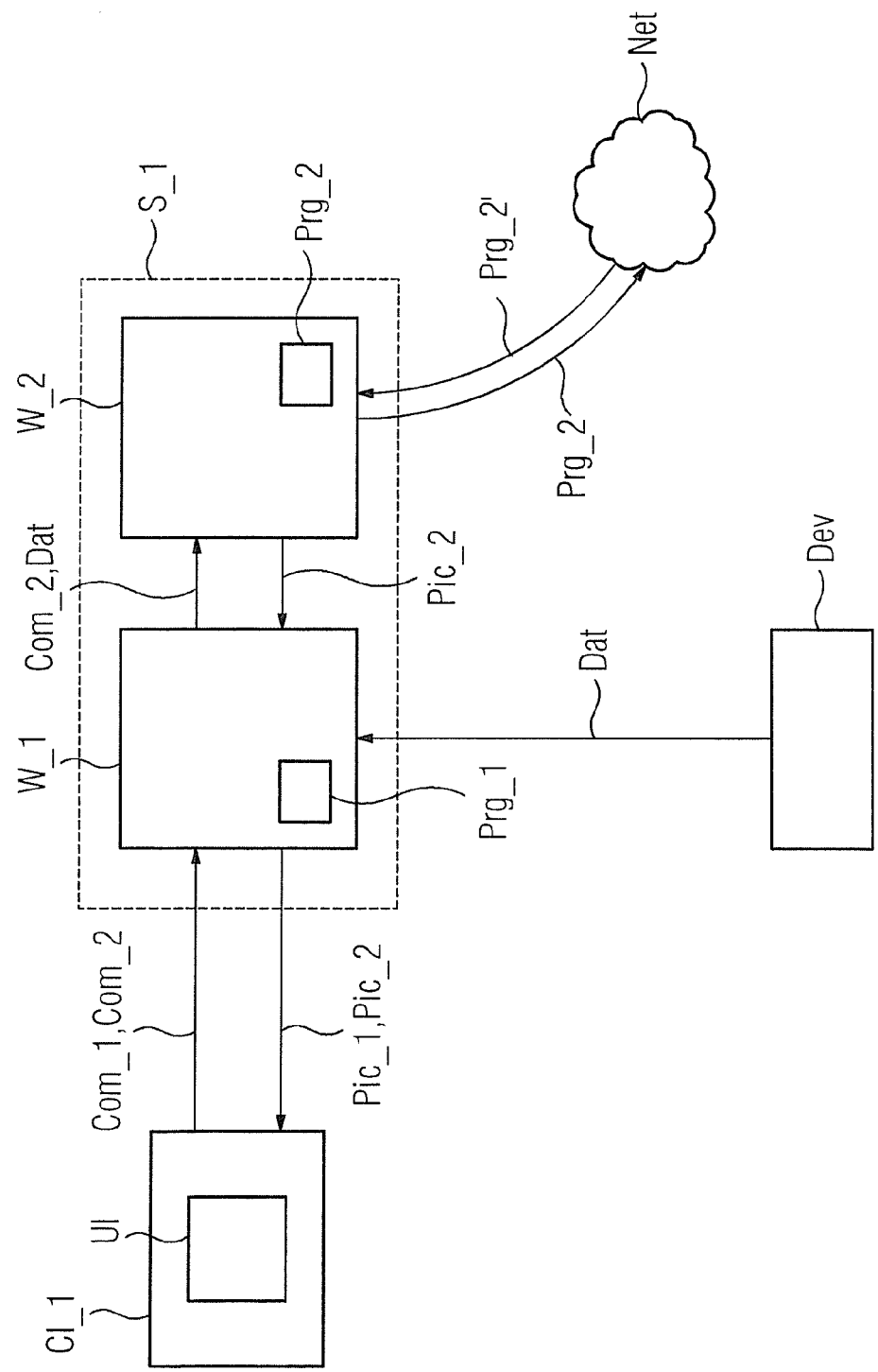
FIG. 1 is a schematic depiction of a computer system according to the invention.

FIG. 1 is a schematic depiction of a computer system according to the invention. The computer system has a first working environment W_1 with a first program Prg_1 for image processing. The computer system furthermore has a second working environment W_2, logically separated from the first working environment W_1, with a second program Prg_2 for image processing. The programs are respectively stored in their working environment and can be executed within their respective working environments without thereby accessing the resources (such as computing capacity or working memory) of the respective other working environment. The first program Prg_1 can be a program permitted as a medical product. The first program Prg_1 is to be classified as secure, such that it on the one hand delivers reliable, reproducible results and furthermore exerts no unwanted, harmful influence. In contrast to this, the second program Prg_2 can also be a program that is not permitted as a medical product, for example a prototype that should be tested. Therefore, the second program Prg_2 can exert an unwanted or even harmful influence, for example on the image data Dat to be processed or on other programs stored in the second working environment W_2. Via the logical separation of the first working environment W_1 and the second working environment W_2, however, it is not possible for the second program Prg_2 to exert an unwanted or harmful influence beyond the second working environment W_2.

Figure 2:
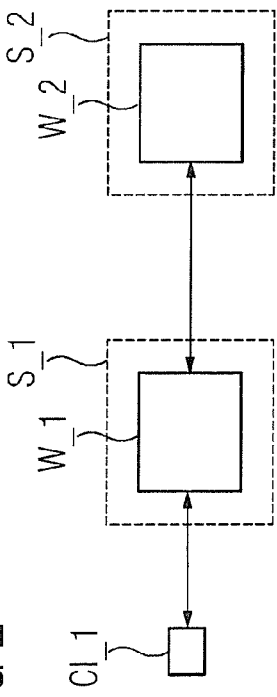
FIG. 2 is a schematic depiction of a computer system according to the invention with two separate servers.

At least the first working environment W_1 is implemented at a first server S1. In the example shown in FIG. 1, the second working environment W_2 is also implemented at the first server S1, wherein the logical separation can be achieved via what is known as sandboxing, for example. Sandboxing can be implemented in different layers. A special sandbox layer can thus be implemented in the form of library functions in the first working environment W_1, which sandbox layer captures the system calls of the second program Prg_2 and defines a second working environment W_2. However, the sandbox layer can also be implemented as part of the operating system, in particular the operating system of the first server S_1 or of the first working environment W_1. In one embodiment, the second working environment W_2 is implemented as a virtual machine which provides a secure runtime environment. An alternative embodiment exists in that—as shown in FIG. 2—the second working environment is implemented at a server S_2 separate from the first server S_1.

Both the first program Prg_1 and the second program Prg_2 are controlled via the first working environment W_1. The uniform control of the programs takes place by means of a first client Cl_1 which has a uniform user interface UI. A first command COM_1 to execute the first program Prg_1 and a second command COM_2 to execute the second program Prg_2 can be set to the first working environment W_1 from this uniform user interface UI. The second command COM_2 is then relayed from the first working environment W_1 to the second working environment W_2. The user of the computer system according to the invention can thus execute different programs in different working environments particularly simply, quickly and securely.

Image data Dat are first sent to the first working environment W_1 and stored therein. In one development of the invention, a number of different sets of image data are thereby sent to the first working environment W_1 and stored in this. One set of image data can in particular be a patient data set, thus image data Dat which can be associated with a specific examination and a specific patient. Image data Dat can be selected for processing via the first client Cl_1. According to one aspect of the invention, it is thereby possible that the image data Dat are displayed at an output unit associated with the first client Cl_1, in particular in a form that is compressed relative to the complete image data Dat. In one embodiment of the invention, an input unit is associated with the first client Cl_1, wherein the input unit is designed to input the first command COM_1 and the second command COM_2 such that they can be sent to the first working environment W_1 via the first client Cl_1. The input unit is a keyboard, a mouse, a microphone or what is known as a touchscreen, for example.

According to one aspect of the invention, the uniform user interface UI is designed so that first a defined set of image data Dat is selected, and then the program for processing the image data Dat is chosen. Therefore, the command to execute a program can also include the command to process a specific set of image data. If a program in the second working environment W_2 is thereby selected and the corresponding command has been sent to the first working environment W_1, in one embodiment a check step is implemented. The check step includes the check as to whether the image data Dat to be processed are stored in the second working environment W_2. If the image data Dat to be processed are already stored in the second working environment W_2, the second command COM_2 for execution of the second program Prg_2 can be sent to the second working environment W_2. If the image data Dat to be processed are not stored in the second working environment W_2, a copy of the selected image data Dat is sent from the first working environment W_1 to the second working environment W_2 and stored there. According to one aspect of the invention, the second command COM_2 for execution of the second program is only sent onward after the test and possibly the transmission and storage of the image data. Via the check step, the method according to the invention is particularly efficient since time for transfer of the image data Dat or storage space for new storage of the image data Dat can be saved.

The check step is optional. It is only reasonable to implement it if the second working environment W_2 possesses sufficient storage space to store a plurality of sets of image data. However, the storage of the second working environment W_2 is typically not designed for long-term archiving of image data, such that the storage is markedly smaller than, for example, the storage of an archiving server PACS. In one variant of the invention, the check step is not implemented. Such a variant is particularly reasonable when the storage of the second working environment W_2 is dimensioned so that it can store only a small number of sets of image data and/or the image data are deleted automatically after successful processing.

The first program Prg_1 has access only to the image data stored in the first working environment W_1, while the second program Prg_2 has access only to the image data stored in the second working environment W_2. An unwanted manipulation of the image data in the first working environment W_1 by the second program Prg_2 is thereby precluded. For example, the first working environment W_1 can receive the image data directly from an imaging apparatus Dev. Other than as shown, the first working environment W_1 can also be connected with multiple imaging apparatuses. In particular, the imaging apparatuses can deal with various imaging modalities (for example computer tomography and C-arm angiography or magnetic resonance tomography) so that the programs can process image data from different imaging modalities or combine said image data with one another. If the imaging apparatus Dev is a computed tomography apparatus, image data in the form of reconstructed thin slices can be sent from the imaging apparatus Dev to the first working environment W_1.

The images PIC_1 processed by the first program Prg_2 are also designated as first images PIC_1, and the images PIC_2 processed by the second program Prg_2 are also designated as second images PIC_2. In one embodiment of the invention, the second image PIC_2 is marked, for example immediately before or upon sending or, respectively, transmission of the second image PIC_2 from the second working environment W_2 to the first working environment W_1. The marking should preclude a confusion of the first image PIC_1 and the second image PIC_2. For example, the marking can take place at the image layer, thus in that specific pixels or voxels are populated with specific values. The pixels or voxels in a defined image layer can thus show a legible marking such as "Not for clinical use". Alternatively, the marking can take place at the database layer, for example in that the file name or the header of the file of the second image PIC_2 is modified. In particular, the marking at the file layer can take place given a DICOM file.

The second image PIC_2 is sent from the second working environment W_2 to the first working environment W_1 for later presentation. The uniform user interface UI is designed to show the results of the image processing of different programs. For this, the processed images PIC_1 and PIC_2 are sent from the first working environment to the first client Cl_1. The presentation of the user interface—and therefore of the processed images PIC_1 and PIC_2—takes place by means of a graphical output unit associated with the first client Cl_1, for example. The graphical output unit can be an LCD screen, an LED screen or a projector. In a further embodiment of the invention, input unit and output unit together with the first client Cl_1 form an integrated unit, for example in the form of a wearable computer or what is known as a tablet.

In the embodiment of the invention that is shown in FIG. 1, the computer system is designed to update the second program Prg_2 via a connection of the second working environment W_2 with a network Net. The network Net can be an internal network (such as an intranet), but can also be the Internet. The updating offers the advantage that the computer system always provides the newest version of the second program Prg_2. Such an updating can take place both automatically and via a user, through the uniform user interface UI. Furthermore, it is possible that the second program Prg_2 is provided to other computers connected to the network. The second program Prg_2 can thus be loaded onto the network Net. Furthermore, it is possible that a modified second program Prg_2' or additional programs (in particular for image processing) are loaded from the network into the second working environment W_2 and stored there. In particular, the exchange of new programs or new program versions between users of different computer systems according to the invention is thereby simplified.

Furthermore, the user interface UI can have a function in order to select a second program Prg_2 from a group of second programs Prg_2. The second programs Prg_2 can thereby be visualized as graphical symbols in the user interface UI. This concept is also known under the designation "App Store". In particular, the respective selected second program Prg_2 or Prg_2' can be obtained via the network net and be transferred to the working environment W_2.

In one embodiment of the invention, multiple different first programs are stored in the first working environment W_1 so as to be executable and/or multiple different second programs are stored in the second working environment W_2 so as to be executable. In particular, these can be additional programs for image processing. As described previously, the respective programs can be controlled via commands, in particular by commands sent from the first client Cl_1. In one embodiment of the invention, the first client Cl_1 provides a user interface by means of which programs newly available via the network Net can be displayed and selected. For example, the display of the programs available via the network Net includes the display of information such as the origin of the respective program or the function of the respective program. By selection of a program, this is stored in the second working environment W_2.

In one variant of the invention, the computer system is designed so that the second working environment W_2 cannot communicate directly with the first client Cl_1. The second working environment W_2 and the second program Prg_2 can thus then be controlled only via the first working environment W_1. In a further embodiment, the second working environment W_2 has no direct connection with an imaging apparatus Dev or an archiving server PACS.

Figure 3:
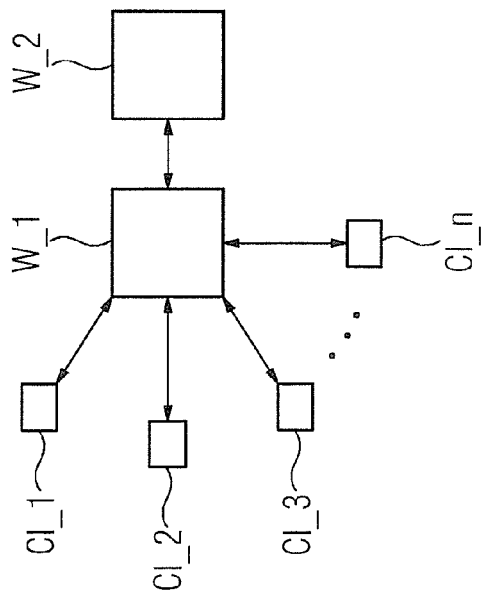
FIG. 3 is a schematic depiction of a computer system according to the invention, with multiple clients.

FIG. 3 is a schematic depiction of a computer system according to the invention, with multiple clients. The flexibility of the use of the computer system according to the invention is increased if multiple clients are designed for communication with the first working environment W_1. The additional clients Cl_2, Cl_3, Cl_n can thereby have the same properties as the first client Cl_1. For example, the additional clients can be distributed among different locations (within a hospital, for example), such that multiple users can be able to process image data Dat. In one embodiment of the invention, the first working environment W_1 is designed to multiple commands (in particular multiple commands to execute at least one program stored in the first working environment W_1 and at least one program stored in the second working environment W_2) of different clients, and to forward the commands to execute the at least one program stored in the second working environment W_2 to said second working environment W_2. In particular, the clients CL_1 through Cl_n can send different commands to execute different programs to the second working environment W_2.

Figure 4:
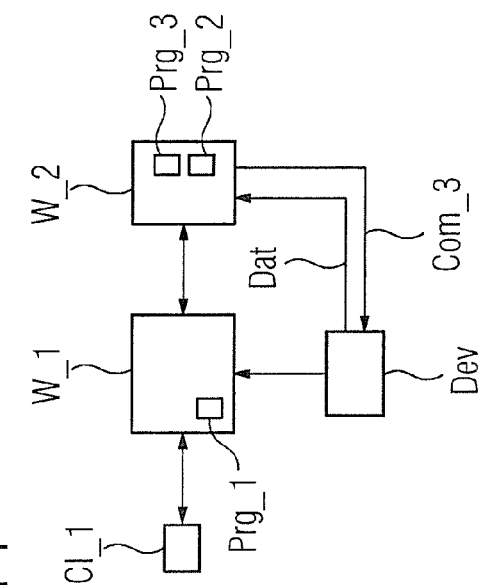
FIG. 4 is a schematic depiction of a computer system according to the invention to control an imaging apparatus.

FIG. 4 is a schematic depiction of a computer system according to the invention for controlling an imaging apparatus. In this embodiment of the invention, the second working environment W_2 has a third program Prg_3 which is designed to control an imaging apparatus Dev so that the functionality of the computer system is further increased. For control, the second working environment W_2 sends a third command COM_3 to the imaging apparatus Dev. Such a third command COM_3 can include specific values for acquisition parameters or reconstruction parameters. In different embodiments of the invention, the third program can be controlled by a client (such as the first client Cl_1) connected with the first working environment W_1 or via an additional client directly connected with the second working environment W_2. In a further variant of the invention, the imaging apparatus Dev itself is designed to communicate with the second working environment W_2 via an interface so that the imaging apparatus Dev can start the third program Prg_3.

Figure 5:
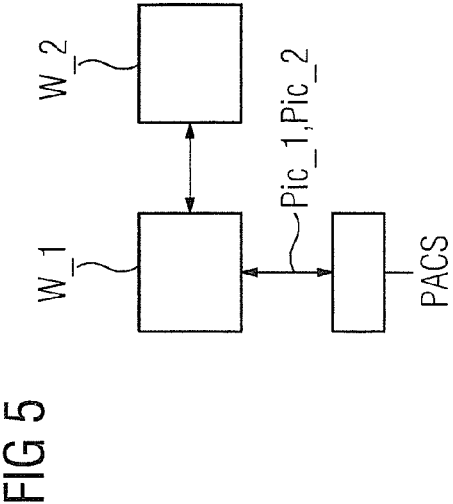
FIG. 5 is a schematic presentation of a computer system according to the invention for communication with an archiving server.

FIG. 5 is a schematic depiction of a computer system according to the invention for communication with an archiving server. The first working environment W_1 is designed to send the first image PIC_1 and the second image PIC_2 to the archiving server PACS for storage. Furthermore, the archiving server PACS is designed to send the processed images PIC_1 and PIC_2 to the first working environment. In a further embodiment of the invention, the imaging apparatus is designed to send the image data Dat directly to the archiving server PACS for storage. If the imaging apparatus is a computed tomography apparatus, the image data Dat can be sent from the computed tomography apparatus to the archiving server PACS, in particular in the form of thick slices [slabs]. According to a further aspect of the invention, the archiving server PACS is also designed to send archived image data to the first working environment W_1 for processing.

Figure 6:
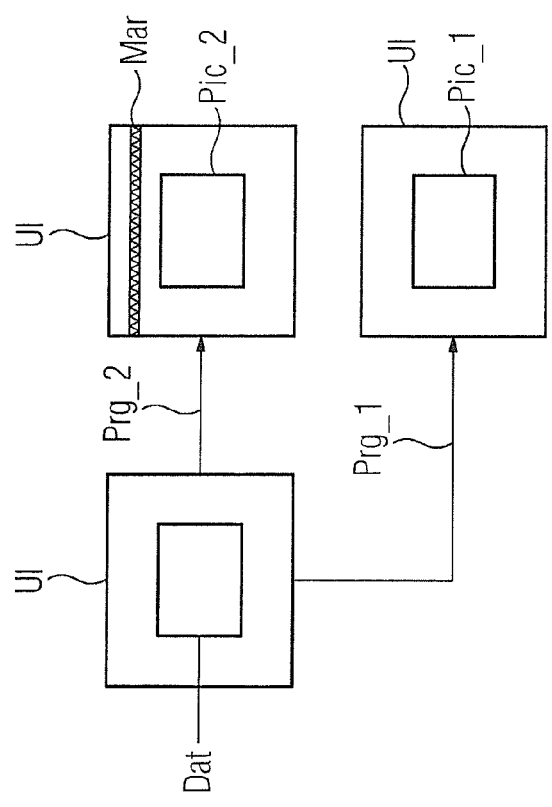
FIG. 6 is a schematic depiction of a uniform user interface according to the invention.

FIG. 6 is a schematic depiction of a uniform user interface according to the invention. According to one aspect of the invention, the image data Dat can be displayed in the uniform user interface UI, for example in a viewing window. If the first program Prg_1 is executed, the first image PIC_1 can be displayed within the uniform user interface UI. If the second program Prg_2 is executed, the second image PIC_2 can likewise be displayed within the uniform user interface UI. The uniform user interface UI is furthermore characterized in that the symbols for execution of specific work steps (such as the execution of a program or the display of an image) have a uniform design, for example in shape and coloration, independent of whether the symbols for execution of the first or second program or, respectively, for displaying the first and second image are provided. Furthermore, the first and second image are shown with the same image impression in the uniform user interface UI. Such a uniform presentation can take place in that the first and second image have the same presets with regard to contrast and brightness, or in that identically sized images (for example measured in the number of pixels) are shown at the same size. Furthermore, the same tools for additional processing of the first and second image are provided in the uniform user interface UI.

In one variant of the invention, a marking Mar of the graphical user interface UI takes place. In the example shown here, this marking Mar takes place in that a bar is mixed in. Other symbols and shapes can also be mixed is as a marking Mar, in particular in warning colors such as red or orange. Furthermore, a writing such as "Not for clinical use" can be mixed in as a marking Mar. The marking Mar in association with second images PIC_2 increases the security in that a warning is given before a switch between first images PIC_1 and second images PIC_2.

Figure 7:
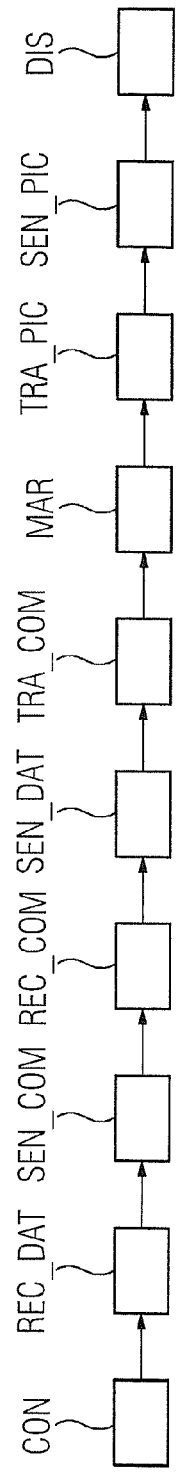
FIG. 7 is a schematic depiction of the method according to the invention.

FIG. 7 is a schematic depiction of the method according to the invention. The individual method steps can thereby be implemented in a different order than the one indicated here, insofar as this is technically reasonable. In particular, a check step as described in the preceding can take place immediately after the selection of image data Dat and a program in the second working environment W_2, or after the step REC_COM. If the check yields that the selected image data Dat is already available (in particular stored) in the second working environment W_2, the step of sending or, respectively, transferring the image data Dat can be omitted. Furthermore, not all self-evident steps are explicitly considered or described in FIG. 7 (for example the receipt of the image data Dat by the second working environment); the transmission of a command or image as in the steps TRA_COM and TRA_PIC has also not been subdivided into the individual steps of transmission and reception. Furthermore, the step of updating a program stored in the second working environment W_2 by a network Net is not explicitly considered in FIG. 7 since it can in principle be executed at any point in time of the method according to the invention.

Although modifications and changes may be suggested by those skilled in the art, it is the intention of the inventors to embody within the patent warranted hereon all changes and modifications as reasonably and properly come within the scope of their contribution to the art.

We claim as our invention:

1. A computer system for image processing, comprising:
a server configured to form a first working environment, comprising a first program for image processing, and to form a second working environment, logically separated from the first working environment, comprising a second program for image processing;
said server being configured to receive, from at least one client of said server, a first command to execute the first program, and to receive a second command in said first working environment from said at least one client to execute the second program, and to send the second command from the first working environment to the second working environment;
said server in said second working environment being configured to process an image according to said second command and to send said image processed by the second program according to said second command to the first working environment; and
said server being configured to emit, in electronic form from said first working environment, said image processed by the second program according to said second command.

2. A computer system as claimed in claim 1 wherein said at least one client of said server comprises a user interface configured to send the first command and the second command to the first working environment.

3. A computer system as claimed in claim 2 wherein said server is configured, in said first working environment, to process an image according to said first command, and to send said image processed by the first program, and the image processed by the second program according to said second command, to said at least one client, and wherein said at least one client is configured to present said first and second client at said user interface.

4. A computer system as claimed in claim 1 wherein said server in said first working environment is configured to receive image data from said at least one client and to send said image data to said second working environment.

5. A computer system as claimed in claim 1 wherein said server is configured to access a network to receive an update to update the second program in said second working environment.

6. A computer system as claimed in claim 1 wherein said server is configured to embody a marking in said image processed by said second program that designates said image processed by said second program as having been processed by said second program.

7. A computer system as claimed in claim 1 wherein said server is configured in said second working environment to provide a third program that controls an imaging apparatus and wherein said server through said second working environment is directly connected with said imaging apparatus and is configured to control the imaging apparatus using said third program.

8. A computer system for image processing, comprising:
a first server configured to form a first working environment comprising a first program for image processing;
a second server, separate from said first server, configured to form a second working environment that is logically separated from said first working environment, and that comprises a second program for imaging processing;
said first server in said first working environment being configured to receive a first command, from at least one client of said server, to execute said first program and to receive a second command in said first working environment from said at least one client to execute the second program, and to send the second command from the first working environment to the second working environment at said second server;
said second server in said second working environment being configured to send an image processed by the second program to said first working environment at said first server, and said first server being configured to emit, in electronic form from said first working environment, said image processed by the second program according to said second command.

9. A computer system as claimed in claim 8 wherein said at least one client comprises a user interface configured to send the first command and the second command to the first working environment.

10. A computer system as claimed in claim 9 wherein said first server is configured, in said first working environment, to process an image according to said first command, and to send said image processed by the first program, and the image processed by the second program according to said second command, to said at least one client, and wherein said at least one client is configured to present said first and second client at said user interface.

11. A computer system as claimed in claim 8 wherein said first server in said first working environment is configured to receive image data from said at least one client and to send said image data to said second working environment.

12. A computer system as claimed in claim 8 wherein said second server is configured to access a network to receive an update to update the second program in said second working environment.

13. A computer system as claimed in claim 8 wherein said second server is configured to embody a marking in said image processed by said second program that designates said image processed by said second program as having been processed by said second program.

14. A computer system as claimed in claim 8 wherein said second server is configured in said second working environment to provide a third program that controls an imaging apparatus and wherein said second server through said second working environment is directly connected with said imaging apparatus and is configured to control the imaging apparatus using said third program.

15. A method for image processing, comprising:
configuring at least one server with a first working environment to execute a first program for image processing, and a second working environment, logically separated from said first working environment, to execute a second program for image processing;
via said first working environment, receiving a first command to execute said first program and receiving a second command to execute said second program;
sending the second command from the first working environment to the second working environment;
processing an image in said second program and sending the image processed by said second program from the second working environment to the first working environment; and
from said server, emitting, from said first working environment, the image processed by said second program, as an electronic output from said server.

16. A method as claimed in claim 15 comprising forming a user interface as a client of said at least one server, and sending said first command and said second command from said user interface to said first working environment at said at least one server.

17. A method as claimed in claim 16 comprising sending an image process by the first program or the image process by the second program to the client, and displaying the image sent to said client at said user interface.

18. A method as claimed in claim 15 comprising receiving image data through said first working environment, and sending the image data from the first working environment to the second working environment.

19. A method as claimed in claim 15 comprising placing said server in communication with network and updating said program stored in said second working environment via said network.

20. A method as claimed in claim 15 comprising, in said server, embodying a marking in said image process by said second program that designates said image process by said second program as having been processed by said second program.

21. A method as claimed in claim 15 comprising configuring said at least one server with a third program in said second working environment and controlling an imaging apparatus with said third program directly from said second working environment.

* * * * *